(12) United States Patent
Li et al.

(10) Patent No.: US 9,760,998 B2
(45) Date of Patent: Sep. 12, 2017

(54) VIDEO PROCESSING METHOD AND APPARATUS

(71) Applicant: TENCENT TECHNOLOGY (SHENZHEN) COMPANY LIMITED, Shenzhen, Guangdong (CN)

(72) Inventors: Feiyun Li, Shenzhen (CN); Shizhu Huang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/987,858

(22) Filed: Jan. 5, 2016

(65) Prior Publication Data

US 2016/0133006 A1 May 12, 2016

Related U.S. Application Data

(63) Continuation of application No. PCT/CN2015/073213, filed on Feb. 17, 2015.

(30) Foreign Application Priority Data

Mar. 3, 2014 (CN) .......................... 2014 1 0075138

(51) Int. Cl.
*G06K 9/00* (2006.01)
*G06T 7/00* (2017.01)
(Continued)

(52) U.S. Cl.
CPC ................ *G06T 7/004* (2013.01); *G06T 7/70* (2017.01); *G06T 11/00* (2013.01); *G06T 17/00* (2013.01);
(Continued)

(58) Field of Classification Search
CPC . G06T 7/004; G06T 7/70; G06T 11/00; G06T 17/00; G06T 19/006;
(Continued)

(56) References Cited

U.S. PATENT DOCUMENTS 7,019,748 B2 3/2006 Raskar
8,456,467 B1 * 6/2013 Hickman ............... G06T 15/005
345/419
(Continued)

FOREIGN PATENT DOCUMENTS

CN 103294453 A 9/2013
CN 104157007 A 11/2014

OTHER PUBLICATIONS

International Search Report in international application No. PCT/CN2015/073213, mailed on May 4, 2015.

*Primary Examiner* — Ali Bayat
(74) *Attorney, Agent, or Firm* — Baker Hostetler LLP

(57) ABSTRACT

The present disclosure discloses a video processing method and apparatus, which belong to the field of data processing technologies. The method includes: acquiring at least one three-dimensional image, and obtaining a to-be-processed video; parsing the to-be-processed video, to obtain at least two video images; fusing each three-dimensional image with each video image separately, to obtain fused video images; and synthesizing the fused video images into a video, to obtain a processed video. The present disclosure separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, (Continued)

thereby expanding an application range of video processing, and enriching display effects of the processed video.

10 Claims, 6 Drawing Sheets

(51) Int. Cl.
| | | |
|---|---|---|
| | *G11B 27/034* | (2006.01) |
| | *G06T 19/00* | (2011.01) |
| | *G06T 11/00* | (2006.01) |
| | *G06T 17/00* | (2006.01) |
| | *G06T 7/70* | (2017.01) |

(52) U.S. Cl.
CPC .......... *G06T 19/006* (2013.01); *G11B 27/034* (2013.01); *G06T 2207/10016* (2013.01); *G06T 2207/10028* (2013.01); *G06T 2207/20221* (2013.01)

(58) Field of Classification Search
CPC . G06T 2207/10016; G06T 2207/10028; G06T 2207/20221; H04N 19/46; H04N 19/597; H04N 13/0048; H04N 13/0059
See application file for complete search history.

(56) References Cited

U.S. PATENT DOCUMENTS

| | | | |
|---|---|---|---|
| 8,462,152 B2* | 6/2013 | Rose | G06T 13/00 345/420 |
| 2002/0080148 A1 | 6/2002 | Uchino | |
| 2003/0043152 A1 | 3/2003 | Raskar | |
| 2008/0170806 A1* | 7/2008 | Kim | H04N 13/0048 382/285 |
| 2012/0075420 A1* | 3/2012 | Cho | H04N 13/0048 348/43 |
| 2014/0285622 A1* | 9/2014 | Nandhakumar | H04N 13/0029 348/43 |
| 2014/0354633 A1 | 12/2014 | Zhang et al. | |

* cited by examiner

VIDEO PROCESSING METHOD AND APPARATUS

CROSS REFERENCE TO RELATED APPLICATIONS

This is a continuation application of International Patent Application No. PCT/CN2015/073213, filed on Feb. 17, 2015, which claims priority to Chinese Patent Application No. 201410075138.8 filed on Mar. 3, 2014, the disclosures of which are incorporated by reference herein in their entirety.

FIELD OF THE TECHNOLOGY

The present disclosure relates to the field of data processing technologies, and in particular, to a video processing method and apparatus.

BACKGROUND OF THE DISCLOSURE

With the continuous development of data processing technologies, watching videos has become a common entertainment. To enrich video playback effects, videos are usually processed to obtain videos having special effects. For example, one or more images are added to a video to obtain a video with a watermark effect. Therefore, how to process videos has become an issue people are concerned with.

At present, during video processing, at least one two-dimensional image and a to-be-processed video are acquired; the to-be-processed video is parsed to obtain multiple video images; and each two-dimensional image is separately fused with multiple video images, and fused video images are synthesized into a video, to obtain a processed video.

When implementing the present disclosure, the inventor finds that the existing technology at least has the following problem:

What is acquired is a two-dimensional image, and therefore, what is displayed by a processed video is also a two-dimensional image, which limits an application range of video processing and a display effect of the processed video.

SUMMARY

In order to solve the technical problem in the existing technology, embodiments of the present disclosure provide a video processing method and apparatus. The technical solutions are as follows:

According to a first aspect, a video processing method is provided, including:

acquiring at least one three-dimensional image, and acquiring a to-be-processed video;

parsing the to-be-processed video, to obtain at least two video images;

fusing each three-dimensional image with each video image separately, to obtain fused video images; and synthesizing the fused video images into a video, to obtain a processed video.

According to a second aspect, a video processing apparatus is provided, including:

a first acquiring module, configured to acquire at least one three-dimensional image;

a second acquiring module, configured to acquire a to-be-processed video;

a parsing module, configured to parse the to-be-processed video, to obtain at least two video images;

a fusion module, configured to fuse each three-dimensional image with each video image separately, to obtain fused video images; and a synthesis module, configured to synthesize the fused video images into a video, to obtain a processed video.

The technical solutions provided by the embodiments of the present invention produce the following beneficial effects:

Each acquired three-dimensional image is separately fused with each video image obtained by parsing an acquired to-be-processed video, and fused video images are synthesized into a video, to obtain a processed video, which implements adding a three-dimensional image to a video, and enables a processed video to display a three-dimensional image, thereby expanding an application range of video processing, and enriching display effects of the processed video.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, the technical solutions, and advantages of the present disclosure clearer, the implementation manners of the present disclosure will be described in more detail below with reference to the accompanying drawings.

Embodiment 1

Figure 1:
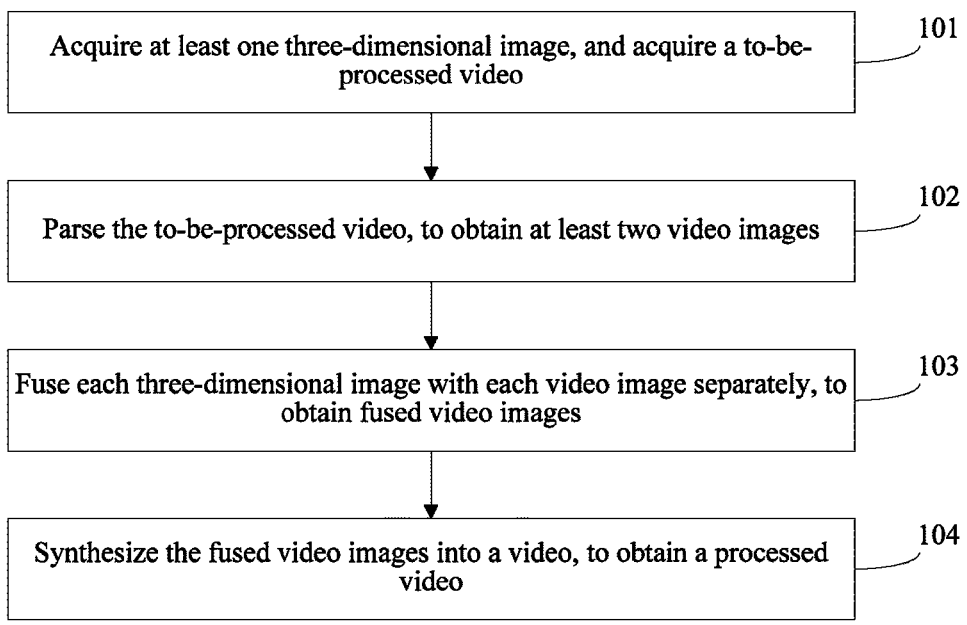
FIG. 1 is a flowchart of a video processing method according to Embodiment 1 of the present invention.

In the current video processing manner of adding a two-dimensional image to a to-be-processed video, only two-dimensional images can be added to a to-be-processed video, and a processed video displays two-dimensional images, which limits an application range of video processing and a display effect of the processed video; therefore, this embodiment of the present invention provides a video processing method, which implements adding three-dimensional images to a to-be-processed video, and enables a processed video to display three-dimensional images. Referring to FIG. 1, a method process includes:

101: Acquire at least one three-dimensional image, and acquire a to-be-processed video.

As an optional embodiment, the acquiring at least one three-dimensional image includes:

acquiring a three-dimensional animation, and parsing the three-dimensional animation, to obtain multiple three-dimensional images.

102: Parse the to-be-processed video, to obtain at least two video images.

103: Fuse each three-dimensional image with each video image separately, to obtain fused video images.

It should be noted that, because at least one three-dimensional image is provided, and at least two video images are provided, the number of three-dimensional images may be different from that of video images; when each three-dimensional image is separately fused with each video image, each three-dimensional image may be separately fused with each video image according to the number of three-dimensional images and the number of video images. For example, when the number of three-dimensional images is less than that of video images, one three-dimensional image may be separately fused with multiple video images; and when the number of three-dimensional images is equal to that of video images, one three-dimensional image may be fused with one video image. This embodiment does not limit the manner of separately fusing each three-dimensional image with each video image, and for details, reference may be made to specific description of subsequent steps and subsequent embodiments.

As an optional embodiment, the fusing each three-dimensional image with each video image separately, to obtain fused video images includes:

parsing each three-dimensional image, to obtain at least one three-dimensional model file, one three-dimensional model file corresponding to one three-dimensional image;

generating at least two three-dimensional models according to each three-dimensional model file and each video image that are obtained through parsing; and converting each generated three-dimensional model into a corresponding two-dimensional image, and using all two-dimensional images that are obtained through conversion as the fused video images.

As an optional embodiment, the parsing each three-dimensional image includes:

creating a three-dimensional image model according to each three-dimensional image, and exporting each three-dimensional image model as a three-dimensional model file.

As an optional embodiment, the generating at least two three-dimensional models according to each three-dimensional model file and each video image that are obtained through parsing includes:

creating a three-dimensional space, and generating a three-dimensional sub-model in the three-dimensional space according to each three-dimensional model file obtained through parsing, to obtain at least one three-dimensional sub-model; and determining a video image corresponding to each three-dimensional sub-model, and synthesizing, by using the video image corresponding to each three-dimensional sub-model as a background, each three-dimensional sub-model and the video image corresponding to each three-dimensional sub-model into a three-dimensional model, to obtain at least two three-dimensional models.

As an optional embodiment, after the determining a video image corresponding to each three-dimensional sub-model, the method further includes:

determining position information and rotation angle information of a key object in the video image corresponding to each three-dimensional sub-model; and synthesizing, by using the video image corresponding to each three-dimensional sub-model as a background, each three-dimensional sub-model and the video image corresponding to each three-dimensional sub-model into a three-dimensional model, including:

converting, according to the position information and the rotation angle information of the key object in the video image corresponding to each three-dimensional sub-model, the position information of each key object into position information in the three-dimensional space;

converting each three-dimensional sub-model according to the position information, of the key object in the video image corresponding to each three-dimensional sub-model, in the three-dimensional space; and synthesizing, by using the video image corresponding to each three-dimensional sub-model as a background, each converted three-dimensional sub-model and the video image corresponding to the three-dimensional sub-model into a three-dimensional model.

As an optional embodiment, the determining position information of a key object in the video image corresponding to each three-dimensional sub-model includes:

sorting the video images corresponding to the three-dimensional sub-models, and identifying position information of a key object in the first video image corresponding to the first three-dimensional sub-model; and tracking, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

104: Synthesize the fused video images into a video, to obtain a processed video.

The method provided in this embodiment separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

Embodiment 2

Figure 2:
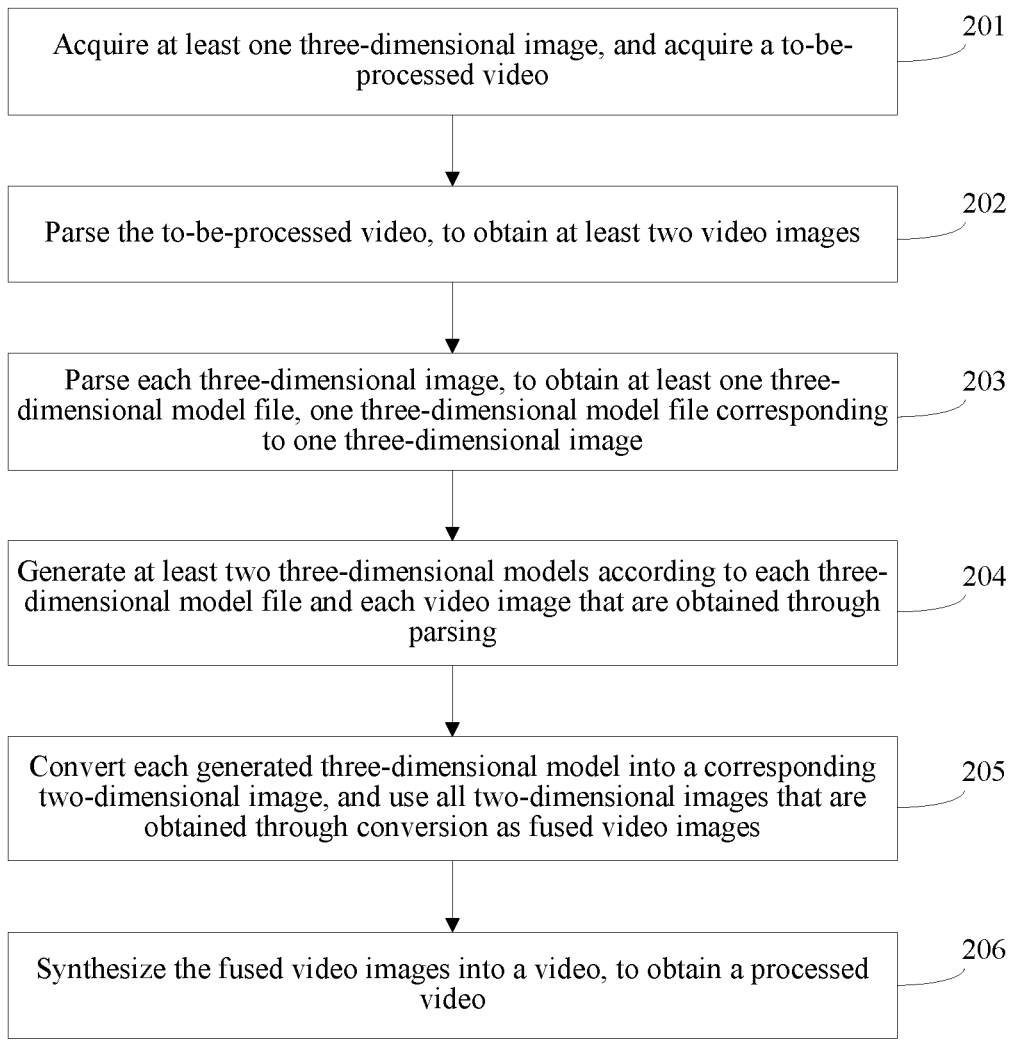
FIG. 2 is a flowchart of a video processing method according to Embodiment 2 of the present invention.

This embodiment of the present invention provides a video processing method. The method provided by this embodiment of the present invention is elaborated with reference to the content of Embodiment 1. Referring to FIG. 2, a method process includes:

201: Acquire at least one three-dimensional image, and acquire a to-be-processed video.

This embodiment does not specifically limit the manner of acquiring the three-dimensional image. In specific implementation, a three-dimensional image designed by a user with a 3D Max tool may be acquired, and the three-dimensional image designed by the user is used as the acquired three-dimensional image. Certainly, apart from the foregoing three-dimensional image acquiring manner, other manners may also be used. For example, a locally stored three-dimensional image may be acquired, and the locally stored three-dimensional image acquired is used as the acquired three-dimensional image.

When multiple three-dimensional images are acquired, the method provided by this embodiment further includes, but is not limited to: acquiring a three-dimensional animation, and parsing the three-dimensional animation to obtain multiple three-dimensional images. This embodiment does not specifically limit the manner of parsing the three-dimensional animation. In specific implementation, the parsing manner includes, but is not limited to, parsing each frame of three-dimensional image in the three-dimensional animation.

Besides, this embodiment does not specifically limit the manner of acquiring the to-be-processed video. In specific implementation, a downloaded to-be-processed video may be acquired, and the downloaded to-be-processed video is used as the acquired to-be-processed video. Certainly, apart from the foregoing to-be-processed video acquiring manner, other manners may also be used. For example, a locally stored to-be-processed video is acquired, and the locally stored to-be-processed video acquired is used as the acquired to-be-processed video.

This embodiment does not limit the sequence of acquiring at least one three-dimensional image and acquiring a to-be-processed video. In specific implementation, at least one three-dimensional image may be acquired first, and then a to-be-processed video is acquired; alternatively, a to-be-processed video may be acquired first, and then, at least one three-dimensional image is acquired.

202: Parse the to-be-processed video, to obtain at least two video images.

Besides, this embodiment does not specifically limit the manner of parsing the to-be-processed video. In specific implementation, the to-be-processed video may be parsed by using a video codec, to obtain at least two video images. The video codec may be an FFMPEG; each video image obtained through parsing may be a frame of image in the to-be-processed video.

203: Parse each three-dimensional image, to obtain at least one three-dimensional model file, one three-dimensional model file corresponding to one three-dimensional image.

As an optional embodiment, the parsing each three-dimensional image includes, but is not limited to: creating a three-dimensional image model according to each three-dimensional image, and exporting each three-dimensional image model as a three-dimensional model file, that is, one three-dimensional model file corresponds to one three-dimensional image. This embodiment does not limit the format of the three-dimensional model file. In specific implementation, the format of the three-dimensional model file may be obj, md2, or the like, and each three-dimensional model file records image information, angle information, position information, and the like of one three-dimensional image model.

204: Generate at least two three-dimensional models according to each three-dimensional model file and each video image that are obtained through parsing.

As an optional embodiment, the generating at least two three-dimensional models according to each three-dimensional model file and each video image that are obtained through parsing includes, but is not limited to:

creating a three-dimensional space, and generating a three-dimensional sub-model in the three-dimensional space according to each three-dimensional model file obtained through parsing, to obtain at least one three-dimensional sub-model; and determining a video image corresponding to each three-dimensional sub-model, and synthesizing, by using the video image corresponding to each three-dimensional sub-model as a background, each three-dimensional sub-model and the video image corresponding to each three-dimensional sub-model into a three-dimensional model, to obtain at least two three-dimensional models.

In order to generate a three-dimensional model in the three-dimensional space according each three-dimensional model file obtained through parsing, the method provided by this embodiment creates a three-dimensional space, and this embodiment does not specifically limit a specific form of the created three-dimensional space. In specific implementation, the created three-dimensional space includes, but is not limited to, a space consisting of a length dimension, a width dimension, and a height dimension. For example, the created three-dimensional space is a space rectangular coordinate system. A three-dimensional sub-model is generated in the created three-dimensional space according to image information, angle information, and position information, which are recorded in each three-dimensional model file, of one three-dimensional image model included in the three-dimensional animation, to obtain at least one three-dimensional sub-model.

Further, this embodiment does not limit the manner of determining the video image corresponding to each three-dimensional sub-model. In specific implementation, the determining manner includes, but is not limited to, determining the video image corresponding to each three-dimensional sub-model according to the number of three-dimensional sub-models and the number of video images.

Because the video image is obtained by parsing the to-be-processed video, while the three-dimensional model file is obtained by parsing the three-dimensional image, the number of video images obtained through parsing may be different from that of three-dimensional model files obtained through parsing, and further, because the number of three-dimensional sub-models is the same as the number of three-dimensional model files obtained through parsing, the number of video images obtained through parsing may be different from that of three-dimensional sub-models. When the video image corresponding to each three-dimensional sub-model is determined according to the number of three-dimensional sub-models and the number of video images, it may include, but is not limited to, the following two situations:

(1) The number of three-dimensional sub-models is less than that of video images.

Because one three-dimensional model file corresponds to one three-dimensional image, and one three-dimensional sub-model is generated in the three-dimensional space according to one three-dimensional model file, it can be considered that one three-dimensional image corresponds to one three-dimensional sub-model. In a case in which the number of three-dimensional sub-models is less than that of video images, a display duration of all three-dimensional images may be determined first, where the display duration is not greater than a display duration of the processed video; and a given number of video images are selected from the at least two video images, where a display duration of the given number of video images is equal to the display duration of all the three-dimensional images. If the number of selected video images is equal to that of three-dimensional sub-models, one three-dimensional sub-model corresponds to one selected video image, thereby determining the video image corresponding to each three-dimensional sub-model; if the number of selected video images is greater than that of three-dimensional sub-models, one three-dimensional sub-model corresponds to multiple selected video images.

This embodiment does not limit the manner of selecting a given number of video images from the at least two video images obtained through parsing. In specific implementation, to ensure the continuity of three-dimensional images in the processed video, the selecting manner includes, but is not limited to, continuously selecting a given number of video images from the at least two video images obtained through parsing. For example, when the number of video images obtained through parsing is 5, the number of three-dimensional sub-models is 2, and the selected video images are the second and third video images in the video images obtained through parsing, the first three-dimensional sub-model corresponds to the second video image, and the second three-dimensional sub-model corresponds to the third video image. For another example, when the number of video images obtained through parsing is 5, the number of three-dimensional sub-models is 2, and the selected video images are the second to fifth video images in the video images obtained through parsing, the first three-dimensional sub-model may correspond to the second and fourth video images, and the second three-dimensional sub-model may correspond to the third and fifth video images; in this manner, when the processed video is played, each three-dimensional image is played twice.

(2) The number of three-dimensional sub-models is equal to that of video images.

Because the number of three-dimensional sub-models is equal to that of video images, one three-dimensional sub-model may directly correspond to one video image, thereby determining the video image corresponding to each three-dimensional sub-model. For example, when the number of video images obtained through parsing and that of three-dimensional sub-models are both 5, the first to fifth three-dimensional sub-models separately correspond to the first to fifth video images.

Further, because the video image corresponding to each three-dimensional sub-model has been determined, by using the video image corresponding to each three-dimensional sub-model as a background, each three-dimensional sub-model and the video image corresponding to each three-dimensional sub-model can be synthesized into a three-dimensional model, to obtain at least two three-dimensional models. It should be noted that, because the video images are two-dimensional, the obtained three-dimensional models are a synthesis of the two-dimensional video images and the three-dimensional sub-model, that is, the video images in the three-dimensional model are still two-dimensional.

As an optional embodiment, after the determining a video image corresponding to each three-dimensional sub-model, the method further includes, but is not limited to:

determining position information and rotation angle information of a key object in the video image corresponding to each three-dimensional sub-model.

The determining position information of a key object in the video image corresponding to each three-dimensional sub-model includes, but is not limited to:

sorting the video images corresponding to the three-dimensional sub-models, and identifying position information of a key object in the first video image corresponding to the first three-dimensional sub-model; and tracking, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

After the position information and the rotation angle information of the key object in the video image corresponding to each three-dimensional sub-model are determined according to the foregoing manner, the method provided by this embodiment synthesizes, by using the video image corresponding to each three-dimensional sub-model as a background, each three-dimensional sub-model and the video image corresponding to each three-dimensional sub-model into a three-dimensional model, which includes, but is not limited to:

converting, according to the position information and the rotation angle information of the key object in the video image corresponding to each three-dimensional sub-model, the position information of each key object into position information in the three-dimensional space;

converting each three-dimensional sub-model according to the position information, of the key object in the video image corresponding to each three-dimensional sub-model, in the three-dimensional space; and synthesizing, by using the video image corresponding to each three-dimensional sub-model as a background, each converted three-dimensional sub-model and the video image corresponding to the three-dimensional sub-model into a three-dimensional model.

For ease of understanding, that the key object in the video image is a face is used as an example for description. The video images corresponding to the three-dimensional sub-models are sorted, and position information of a face in the first video image corresponding to the first three-dimensional sub-model is automatically identified by using a face recognition algorithm; and position information of a face in a video image corresponding to another three-dimensional sub-model is tracked by using an object tracking algorithm and according to the identified position information of the face in the first video image corresponding to the first three-dimensional sub-model, to obtain the position information of the face in the video image corresponding to each three-dimensional sub-model. Rotation angle information of the face in the video image corresponding to each three-dimensional sub-model is calculated according to the position information of the face in the video image corresponding to each three-dimensional sub-model, thereby determining the position information and the rotation angle information of the face in the video image corresponding to each three-dimensional sub-model.

The position information of each face is converted into position information in the three-dimensional space according to the position information and the rotation angle information of the face in the video image corresponding to each three-dimensional sub-model; then, by means such as rotation and zooming, each three-dimensional sub-model is converted into a three-dimensional sub-model adapted to the position information, of the face in the video image corresponding to each three-dimensional sub-model, in the three-dimensional space; and by using the video image corresponding to each three-dimensional sub-model as a background, each converted three-dimensional sub-model and the video image corresponding to the three-dimensional sub-model are synthesized into a three-dimensional model. By means such as rotation and zooming, each three-dimensional sub-model is converted into a three-dimensional sub-model adapted to the position information, of the face in the video image corresponding to each three-dimensional sub-model, in the three-dimensional space, so that the position of the converted three-dimensional sub-model in the three-dimensional model can be adjusted according to the position information, of the face in the video image corresponding to each three-dimensional sub-model, in the three-dimensional space. For example, when the three-dimensional sub-model is a three-dimensional model of a hat, the position of the hat can be dynamically adjusted according to the position information of the face.

205: Convert each generated three-dimensional model into a corresponding two-dimensional image, and use all two-dimensional images that are obtained through conversion as fused video images.

This embodiment does not specifically limit the manner of converting each generated three-dimensional model into a corresponding two-dimensional image. In specific implementation, the conversion manner includes, but is not limited to, converting each generated three-dimensional model into a corresponding two-dimensional image by using a perspective projection algorithm.

Because all the two-dimensional images are converted from the generated three-dimensional models, each three-dimensional model is generated according to each three-dimensional model file and each video image that are obtained through parsing, and each three-dimensional model file is obtained by parsing each three-dimensional image, each of the two-dimensional images obtained through conversion is already fused with a three-dimensional image, and therefore, all the two-dimensional images obtained through conversion can be used as fused video images.

Further, each three-dimensional image is separately fused with each video image by performing step 203 to step 205, to obtain fused video images. In order to obtain a processed video, the method provided by this embodiment further includes a subsequent step:

206: Synthesize the fused video images into a video, to obtain a processed video.

This embodiment does not specifically limit the manner of synthesizing the fused video images into a video either. In specific implementation, the fusing manner includes, but is not limited to, synthesizing the fused video images into a video by using a video codec, where the video codec may be an FFMPEG or the like.

Further, the processed video can be obtained by performing step 201 to step 206, where the processed video is a video having a watermark effect. Because one three-dimensional model file corresponds to one three-dimensional image, and one three-dimensional sub-model corresponds to one three-dimensional model file, one three-dimensional image corresponds to one three-dimensional sub-model. When one three-dimensional image is acquired, one three-dimensional sub-model is generated, and a video image corresponding to the three-dimensional sub-model is determined. No matter the three-dimensional sub-model corresponds to one video image or corresponds to at least two video images, because each video image corresponds to a same three-dimensional sub-model, the watermark effect of the obtained processed video is static. When at least two three-dimensional images are acquired, at least two three-dimensional sub-models are generated, and a video image corresponding to each three-dimensional sub-model is determined. No matter each three-dimensional sub-model corresponds to one video image or corresponds to at least two video images, there are at least two video images corresponding to different three-dimensional sub-models, and therefore, the watermark effect of the obtained processed video is dynamic, that is, the video processing method provided by this embodiment of the present invention not only can obtain a video having a static watermark effect but also can obtain a video having a dynamic watermark effect.

The method provided in this embodiment separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

Embodiment 3

Figure 3:
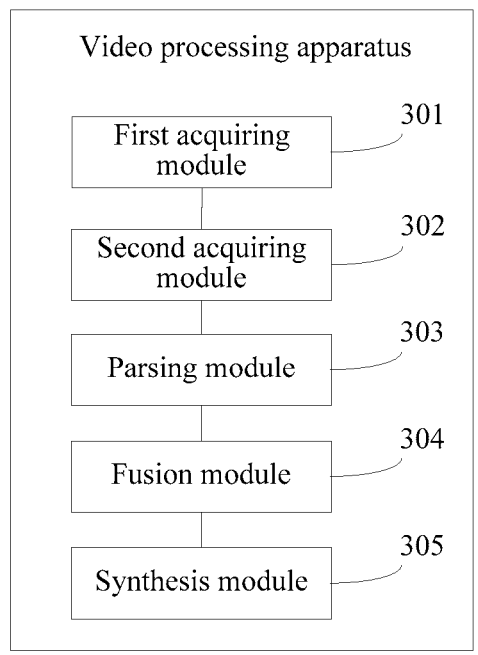
FIG. 3 is a schematic structural diagram of a video processing apparatus according to Embodiment 3 of the present invention.

Referring to FIG. 3, this embodiment of the present invention provides a video processing apparatus, and the apparatus includes:

a first acquiring module 301, configured to acquire at least one three-dimensional image;

a second acquiring module 302, configured to acquire a to-be-processed video;

a parsing module 303, configured to parse the to-be-processed video, to obtain at least two video images;

a fusion module 304, configured to fuse each three-dimensional image with each video image separately, to obtain fused video images; and a synthesis module 305, configured to synthesize the fused video images into a video, to obtain a processed video.

Figure 4:
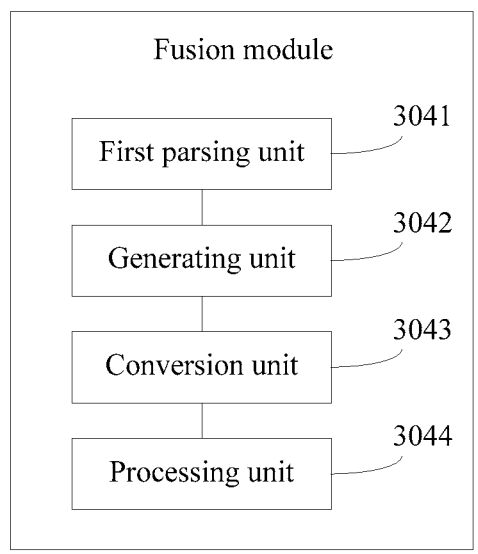
FIG. 4 is a schematic structural diagram of a fusion module according to Embodiment 3 of the present invention.

As an optional embodiment, referring to FIG. 4, the fusion module 304 includes:

a first parsing unit 3041, configured to parse each three-dimensional image, to obtain at least one three-dimensional model file, one three-dimensional model file corresponding to one three-dimensional image;

a generating unit 3042, configured to generate at least two three-dimensional models according to each three-dimensional model file and each video image that are obtained through parsing;

a conversion unit 3043, configured to convert each generated three-dimensional model into a two-dimensional image; and a processing unit 3044, configured to use all two-dimensional images obtained through conversion as the fused video images.

Figure 5:
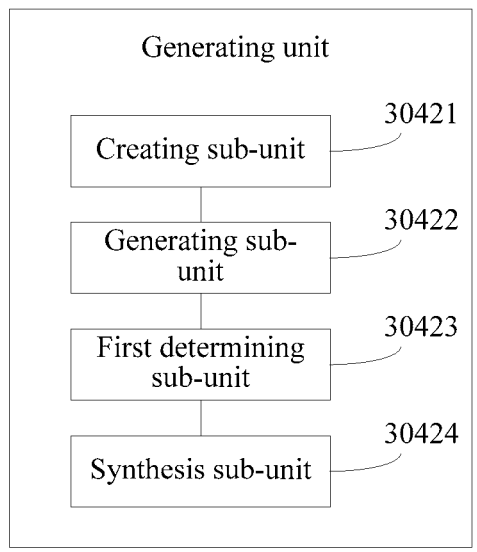
FIG. 5 is a schematic structural diagram of a first type of generating unit according to Embodiment 3 of the present invention.

As an optional embodiment, referring to FIG. 5, the generating unit 3042 includes:

a creating sub-unit 30421, configured to create a three-dimensional space;

a generating sub-unit 30422, configured to generate a three-dimensional sub-model in the three-dimensional space according to each three-dimensional model file obtained through parsing, to obtain at least one three-dimensional sub-model; and a first determining sub-unit 30423, configured to determine a video image corresponding to each three-dimensional sub-model; and a synthesis sub-unit 30424, configured to synthesize, by using the video image corresponding to each three-dimensional sub-model as a background, each three-dimensional sub-model and the video image corresponding to each three-dimensional sub-model into a three-dimensional model, to obtain at least two three-dimensional models.

Figure 6:
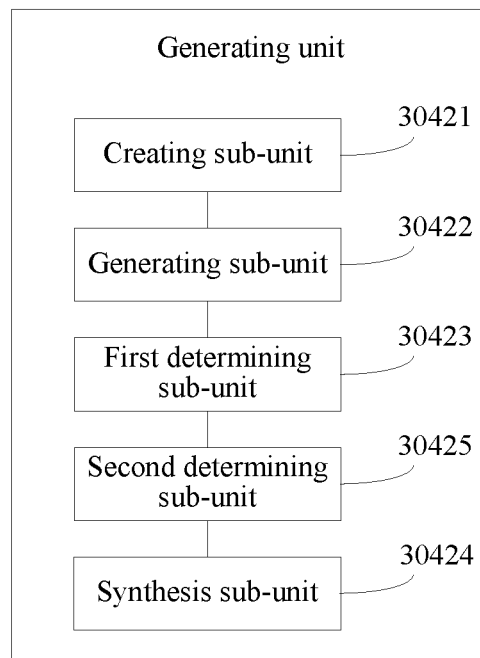
FIG. 6 is a schematic structural diagram of a second type of generating unit according to Embodiment 3 of the present invention.

As an optional embodiment, referring to FIG. 6, the generating unit 3042 further includes:

a second determining sub-unit 30425, configured to determine position information and rotation angle information of a key object in the video image corresponding to each three-dimensional sub-model; and the synthesis sub-unit 30424, configured to convert, according to the position information and the rotation angle information of the key object in the video image corresponding to each three-dimensional sub-model, the position information of each key object into position information in the three-dimensional space, convert each three-dimensional sub-model according to the position information, of the key object in the video image corresponding to each three-dimensional sub-model, in the three-dimensional space, and synthesize, by using the video image corresponding to each three-dimensional sub-model as a background, each converted three-dimensional sub-model and the video image corresponding to the three-dimensional sub-model into a three-dimensional model.

As an optional embodiment, the second determining sub-unit 30425 is configured to sort the video images corresponding to the three-dimensional sub-models, identify position information of a key object in the first video image corresponding to the first three-dimensional sub-model, track, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

Figure 7:
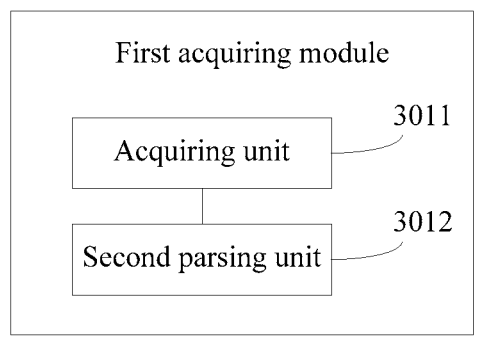
FIG. 7 is a schematic structural diagram of a first acquiring module according to Embodiment 3 of the present invention.

As an optional embodiment, referring to FIG. 7, the first acquiring module 301 includes:

an acquiring unit 3011, configured to acquire a three-dimensional animation; and a second parsing unit 3012, configured to parse the three-dimensional animation, to obtain multiple three-dimensional images.

Figure 8:
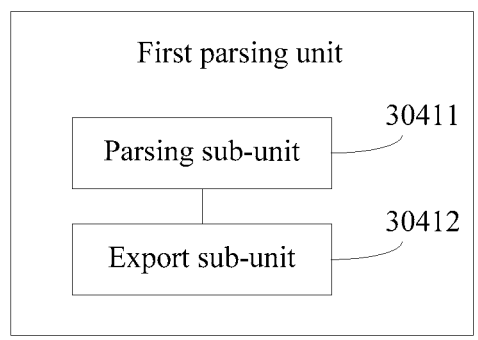
FIG. 8 is a schematic structural diagram of a first parsing unit according to Embodiment 3 of the present invention.

As an optional embodiment, referring to FIG. 8, the first parsing unit 3041 includes:

a parsing sub-unit 30411, configured to create a three-dimensional image model according to each three-dimensional image; and an export sub-unit 30412, configured to export each three-dimensional image model as a three-dimensional model file.

The apparatus provided in this embodiment of the present invention separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

Embodiment 4

Figure 9:
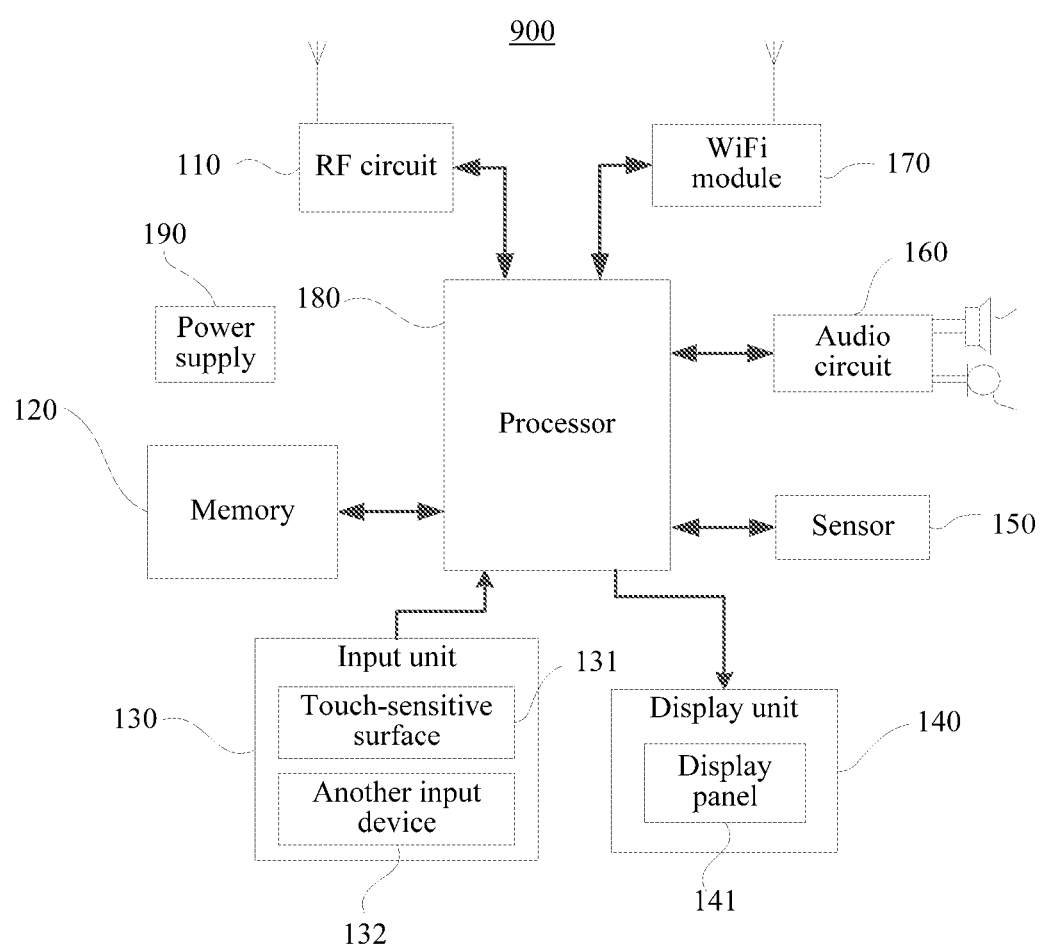
FIG. 9 is a schematic structural diagram of a terminal according to Embodiment 4 of the present invention.

This embodiment of the present invention provides a terminal. Referring to FIG. 9, FIG. 9 shows a schematic structural diagram of a terminal involved in an embodiment of the present invention. The terminal may be configured to implement the video processing method provided in the foregoing embodiment. Specifically:

The terminal 900 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that, the structure of the terminal shown in FIG. 9 does not constitute a limitation to the terminal, and the terminal may include more components or fewer components than those shown in the figure, or some components may be combined, or a different component deployment may be used.

The RF circuit 110 may be configured to receive and send signals during an information sending and receiving process or a call process. Particularly, the RF circuit 1110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by means of wireless communications. The wireless communication may use any communications standard or protocol, which includes, but is not limited to, Global System for Mobile Communication (GSM), General Packet Radio Service (GPRS), Code Division Multiple Access (CDMA), Wideband Code Division Multiple Access (WCDMA), Long Term Evolution, (LTE), e-mail, and Short Messaging Service (SMS).

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high-speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface acoustic wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of a mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 900.

http://baike.baidu.com/view/1524.htm WiFi is a short distance wireless transmission technology. The terminal 900 may help, by using the WiFi module 170, the user to receive and send e-mails, browse web pages, access stream media, and so on, which provides wireless broadband Internet access for the user. Although FIG. 9 shows the WiFi module 170, it may be understood that the WiFi module is not a necessary component of the terminal 900, and when required, the WiFi module may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include one or more processing cores. Preferably, the processor 180 may integrate an application processor and a modem processor. The application processor mainly processes an operating system, a user interface, an application programs, and the like, and the modem processor mainly processes wireless communication. It can be understood that the foregoing modem processor may not be integrated in the processor 180.

The terminal 900 may further include the power supply 190 (such as a battery) for supplying power to the components. Preferably, the power supply may be logically connected to the processor 180 through a power management system, thereby implementing functions such as charging, discharging, and power consumption management by using the power supply management system. The power supply 190 may further include any component, such as one or more direct current or alternating current power supplies, a re-charging system, a power supply fault detection circuit, a power supply converter or an inverter, and a power supply state indicator.

Although not shown in the figure, the terminal 900 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and are configured to be executed by one or more processors, where the one or more programs include instructions for performing the following operations:

acquiring at least one three-dimensional image, and acquiring a to-be-processed video;

parsing the to-be-processed video, to obtain at least two video images;

fusing each three-dimensional image with each video image separately, to obtain fused video images; and synthesizing the fused video images into a video, to obtain a processed video.

Assuming the foregoing is a first possible implementation manner, in a second possible implementation manner provided on the basis of the first possible implementation manner, the memory of the terminal further includes instructions for performing the following operations:

fusing each three-dimensional image with each video image separately, to obtain fused video images, including:

parsing each three-dimensional image, to obtain at least one three-dimensional model file, one three-dimensional model file corresponding to one three-dimensional image;

generating at least two three-dimensional models according to each three-dimensional model file and each video image that are obtained through parsing; and converting each generated three-dimensional model into a corresponding two-dimensional image, and using all two-dimensional images that are obtained through conversion as the fused video images.

In a third possible implementation manner provided on the basis of the second possible implementation manner, the memory of the terminal further includes instructions for performing the following operations:

generating at least two three-dimensional models according to each three-dimensional model file and each video image that are obtained through parsing, including:

creating a three-dimensional space, and generating a three-dimensional sub-model in the three-dimensional space according to each three-dimensional model file obtained through parsing, to obtain at least one three-dimensional sub-model; and determining a video image corresponding to each three-dimensional sub-model, and synthesizing, by using the video image corresponding to each three-dimensional sub-model as a background, each three-dimensional sub-model and the video image corresponding to each three-dimensional sub-model into a three-dimensional model, to obtain at least two three-dimensional models.

In a fourth possible implementation manner provided on the basis of the third possible implementation manner, the memory of the terminal further includes instructions for performing the following operations:

after the video image corresponding to each three-dimensional sub-model is determined, determining position information and rotation angle information of a key object in the video image corresponding to each three-dimensional sub-model; and synthesizing, by using the video image corresponding to each three-dimensional sub-model as a background, each three-dimensional sub-model and the video image corresponding to each three-dimensional sub-model into a three-dimensional model, including:

converting, according to the position information and the rotation angle information of the key object in the video image corresponding to each three-dimensional sub-model, the position information of each key object into position information in the three-dimensional space;

converting each three-dimensional sub-model according to the position information, of the key object in the video image corresponding to each three-dimensional sub-model, in the three-dimensional space; and synthesizing, by using the video image corresponding to each three-dimensional sub-model as a background, each converted three-dimensional sub-model and the video image corresponding to the three-dimensional sub-model into a three-dimensional model.

In a fifth possible implementation manner provided on the basis of the fourth possible implementation manner, the memory of the terminal further includes instructions for performing the following operations:

determining position information of a key object in the video image corresponding to each three-dimensional sub-model, including:

sorting the video images corresponding to the three-dimensional sub-models, and identifying position information of a key object in the first video image corresponding to the first three-dimensional sub-model; and tracking, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

In a sixth possible implementation manner provided on the basis of the first possible implementation manner, the memory of the terminal further includes instructions for performing the following operations:

acquiring at least one three-dimensional image, including:

acquiring a three-dimensional animation, and parsing the three-dimensional animation, to obtain multiple three-dimensional images.

In a seventh possible implementation manner provided on the basis of the second possible implementation manner, the memory of the terminal further includes instructions for performing the following operations:

parsing each three-dimensional image, including:

creating a three-dimensional image model according to each three-dimensional image, and exporting each three-dimensional image model as a three-dimensional model file.

The terminal provided in this embodiment of the present invention separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

Embodiment 5

This embodiment of the present invention further provides a computer readable storage medium. The computer readable storage medium may be a computer readable storage medium included in the memory of the foregoing embodiment, or a separate computer readable storage medium that is not installed in a terminal. The computer readable storage medium has one or more programs stored therein, where the one or more programs are executed by one or more processors to implement a video processing method, and the method includes:

acquiring at least one three-dimensional image, and acquiring a to-be-processed video;

parsing the to-be-processed video, to obtain at least two video images;

fusing each three-dimensional image with each video image separately, to obtain fused video images; and synthesizing the fused video images into a video, to obtain a processed video.

Assuming the foregoing is a first possible implementation manner, in a second possible implementation manner provided on the basis of the first possible implementation manner, the memory of the terminal further includes instructions for performing the following operations:

fusing each three-dimensional image with each video image separately, to obtain fused video images, including:

parsing each three-dimensional image, to obtain at least one three-dimensional model file, one three-dimensional model file corresponding to one three-dimensional image;

generating at least two three-dimensional models according to each three-dimensional model file and each video image that are obtained through parsing; and converting each generated three-dimensional model into a corresponding two-dimensional image, and using all two-dimensional images that are obtained through conversion as the fused video images.

In a third possible implementation manner provided on the basis of the second possible implementation manner, the memory of the terminal further includes instructions for performing the following operations:

generating at least two three-dimensional models according to each three-dimensional model file and each video image that are obtained through parsing, including:

creating a three-dimensional space, and generating a three-dimensional sub-model in the three-dimensional space according to each three-dimensional model file obtained through parsing, to obtain at least one three-dimensional sub-model; and determining a video image corresponding to each three-dimensional sub-model, and synthesizing, by using the video image corresponding to each three-dimensional sub-model as a background, each three-dimensional sub-model and the video image corresponding to each three-dimensional sub-model into a three-dimensional model, to obtain at least two three-dimensional models.

In a fourth possible implementation manner provided on the basis of the third possible implementation manner, the memory of the terminal further includes instructions for performing the following operations:

after the video image corresponding to each three-dimensional sub-model is determined, determining position information and rotation angle information of a key object in the video image corresponding to each three-dimensional sub-model; and synthesizing, by using the video image corresponding to each three-dimensional sub-model as a background, each three-dimensional sub-model and the video image corresponding to each three-dimensional sub-model into a three-dimensional model, including:

converting, according to the position information and the rotation angle information of the key object in the video image corresponding to each three-dimensional sub-model, the position information of each key object into position information in the three-dimensional space;

converting each three-dimensional sub-model according to the position information, of the key object in the video image corresponding to each three-dimensional sub-model, in the three-dimensional space; and synthesizing, by using the video image corresponding to each three-dimensional sub-model as a background, each converted three-dimensional sub-model and the video image corresponding to the three-dimensional sub-model into a three-dimensional model.

In a fifth possible implementation manner provided on the basis of the fourth possible implementation manner, the memory of the terminal further includes instructions for performing the following operations:

determining position information of a key object in the video image corresponding to each three-dimensional sub-model, including:

sorting the video images corresponding to the three-dimensional sub-models, and identifying position information of a key object in the first video image corresponding to the first three-dimensional sub-model; and tracking, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

In a sixth possible implementation manner provided on the basis of the third possible implementation manner, the memory of the terminal further includes instructions for performing the following operations:

acquiring at least one three-dimensional image, including:

acquiring a three-dimensional animation, and parsing the three-dimensional animation, to obtain multiple three-dimensional images.

In a seventh possible implementation manner provided on the basis of the second possible implementation manner, the memory of the terminal further includes instructions for performing the following operations:

parsing each three-dimensional image, including:

creating a three-dimensional image model according to each three-dimensional image, and exporting each three-dimensional image model as a three-dimensional model file.

The computer readable storage medium provided in this embodiment of the present invention separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

Embodiment 6

This embodiment of the present invention provides a graphic user interface. The graphic user interface is used on a terminal, and the terminal includes a touch screen display, a memory, and one or more processors configured to execute one or more programs; the graphical user interface includes:

acquiring at least one three-dimensional image, and acquiring a to-be-processed video;

parsing the to-be-processed video, to obtain at least two video images;

fusing each three-dimensional image with each video image separately, to obtain fused video images; and synthesizing the fused video images into a video, to obtain a processed video.

The graphic user interface provided in this embodiment separately fuses each acquired three-dimensional image with each video image obtained by parsing an acquired to-be-processed video, and synthesizes fused video images into a video, to obtain a processed video, which implements adding a three-dimensional image to a video, and enables a processed video to display a three-dimensional image, thereby expanding an application range of video processing, and enriching display effects of the processed video.

It should be noted that, when the video processing apparatus provided in the forgoing embodiment processes a video, division of the foregoing functional modules is merely an example for description. In an actual application, the foregoing functions may be assigned to and completed by different modules as needed, that is, the internal structure of the apparatus is divided into different functional modules to implement all or some of the functions described above. In addition, the video processing apparatus provided in the foregoing embodiment belongs to the same conception as the embodiment of the video processing method. Refer to the method embodiment for details of the specific implementation process, which is not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A video processing method, comprising:
   acquiring at least one three-dimensional image, and acquiring a video to be processed;
   parsing the video to be processed, to obtain at least two video images;
   fusing each three-dimensional image with each video image separately, to obtain fused video images; and
   synthesizing the fused video images into a video, to obtain a processed video;
   wherein the fusing each three-dimensional image with each video image separately, to obtain fused video images comprises:
      parsing each three-dimensional image, to obtain at least one three-dimensional model file, one three-dimensional model file corresponding to one three-dimensional image;
      generating at least two three-dimensional models according to each three-dimensional model file and each video image that are obtained through parsing; and
      converting each generated three-dimensional model into a corresponding two-dimensional image, and using all two-dimensional images that are obtained through conversion as the fused video images; and
   wherein the generating at least two three-dimensional models according to each three-dimensional model file and each video image that are obtained through parsing comprises:
      creating a three-dimensional space, and generating a three-dimensional sub-model in the three-dimensional space according to each three-dimensional model file obtained through parsing, to obtain at least one three-dimensional sub-model; and
      determining a video image corresponding to each three-dimensional sub-model, and synthesizing, by using the video image corresponding to each three-dimensional sub-model as a background, each three-dimensional sub-model and the video image corresponding to each three-dimensional sub-model into a three-dimensional model, to obtain at least two three-dimensional models.

2. The method according to claim 1, after the determining a video image corresponding to each three-dimensional sub-model, further comprising:
   determining position information and rotation angle information of a key object in the video image corresponding to each three-dimensional sub-model; and
   the synthesizing, by using the video image corresponding to each three-dimensional sub-model as a background, each three-dimensional sub-model and the video image corresponding to each three-dimensional sub-model into a three-dimensional model comprises:
      converting, according to the position information and the rotation angle information of the key object in the video image corresponding to each three-dimensional sub-model, the position information of each key object into position information in the three-dimensional space;
      converting each three-dimensional sub-model according to the position information, of the key object in the video image corresponding to each three-dimensional sub-model, in the three-dimensional space; and
      the synthesizing, by using the video image corresponding to each three-dimensional sub-model as a background, each converted three-dimensional sub-model and the video image corresponding to the three-dimensional sub-model into a three-dimensional model.

3. The method according to claim 2, wherein the determining position information of a key object in the video image corresponding to each three-dimensional sub-model comprises:
   sorting the video images corresponding to the three-dimensional sub-models, and identifying position information of a key object in the first video image corresponding to the first three-dimensional sub-model; and
   tracking, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

4. The method according to claim 1, wherein the acquiring at least one three-dimensional image comprises:
   acquiring a three-dimensional animation, and parsing the three-dimensional animation, to obtain multiple three-dimensional images.

5. The method according to claim 1, wherein the parsing each three-dimensional image comprises:
   creating a three-dimensional image model according to each three-dimensional image, and exporting each three-dimensional image model as a three-dimensional model file.

6. A video processing apparatus, comprising:
   a processor; and
   a non-transitory memory for storing instructions executable by the processor;
   wherein the processor is configured to:
      acquire at least one three-dimensional image;
      acquire a video to be processed;
      parse the video, to obtain at least two video images;
      fuse each three-dimensional image with each video image separately, to obtain fused video images;

synthesize the fused video images into a video, to obtain a processed video;
parse each three-dimensional image, to obtain at least one three-dimensional model file, one three-dimensional model file corresponding to one three-dimensional image;
generate at least two three-dimensional models according to each three-dimensional model file and each video image that are obtained through parsing;
convert each generated three-dimensional model into a two-dimensional image; and
use all two-dimensional images obtained through conversion as the fused video images;
create a three-dimensional space;
generate a three-dimensional sub-model in the three-dimensional space according to each three-dimensional model file obtained through parsing, to obtain at least one three-dimensional sub-model;
determine a video image corresponding to each three-dimensional sub-model; and
synthesize, by using the video image corresponding to each three-dimensional sub-model as a background, each three-dimensional sub-model and the video image corresponding to each three-dimensional sub-model into a three-dimensional model, to obtain at least two three-dimensional models.

7. The apparatus according to claim 6, wherein the processor is further configured to:
determine position information and rotation angle information of a key object in the video image corresponding to each three-dimensional sub-model; and
according to the position information and the rotation angle information of the key object in the video image corresponding to each three-dimensional sub-model, the position information of each key object into position information in the three-dimensional space, convert each three-dimensional sub-model according to the position information, of the key object in the video image corresponding to each three-dimensional sub-model, in the three-dimensional space, and synthesize, by using the video image corresponding to each three-dimensional sub-model as a background, each converted three-dimensional sub-model and the video image corresponding to the three-dimensional sub-model into a three-dimensional model.

8. The apparatus according to claim 7, wherein the processor is further configured to sort the video images corresponding to the three-dimensional sub-models, identify position information of a key object in the first video image corresponding to the first three-dimensional sub-model, track, according to the identified position information of the key object in the first video image corresponding to the first three-dimensional sub-model, position information of a key object in a video image corresponding to another three-dimensional sub-model, to obtain the position information of the key object in the video image corresponding to each three-dimensional sub-model.

9. The apparatus according to claim 6, wherein the
processor is further configured to acquire a three-dimensional animation; and
parse the three-dimensional animation, to obtain multiple three-dimensional images.

10. The apparatus according to claim 6, wherein the
processor is further configured to create a three-dimensional image model according to each three-dimensional image; and
to export each three-dimensional image model as a three-dimensional model file.

* * * * *